Patented May 26, 1925.

1,539,120

UNITED STATES PATENT OFFICE.

HENRY W. KAANTA, OF EL PASO, TEXAS, ASSIGNOR TO AMERICAN SMELTING AND REFINING COMPANY, OF NEW YORK, N. Y., A CORPORATION OF NEW JERSEY.

TREATMENT OF ORES.

No Drawing.      Application filed June 11, 1924. Serial No. 719,330.

*To all whom it may concern:*

Be it known that I, HENRY W. KAANTA, a citizen of the United States, and resident of El Paso, in the county of El Paso and State of Texas, have invented certain new and useful Improvements in the Treatment of Ores, of which the following is a specification.

This invention relates to a process of treating ores containing precious metals such as gold and silver and relates particularly to the treatment of such ores preparatory to their subsequent treatment by the floatation process.

The invention consists broadly in subjecting gold and silver ores in a crushed or finely divided condition to a solution containing a relatively small quantity of an alkaline cyanide for a brief period of time and then adding a suitable precipitant to recover any values dissolved by the cyanide and in subjecting the mixture to a concentration process.

The invention also consists in regulating the quantity of cyanide solution and the period of treatment so as to dissolve any film or coating upon the precious metal particles without attempting to dissolve any substantial portion of the precious metal content of the ores, thereby avoiding interference with the subsequent treatment of the ores and facilitating the subsequent recovery of the precious metals.

The invention further consists in the new and novel features of operation and the new and original arrangement and combination of steps in the process hereinafter described and more particularly set forth in the claims.

In carrying out my improved process the ore to be treated is first ground with water in any well known type of grinding apparatus, for example a ball granulator. Preferably the ore is ground to a size passing through a 100-mesh screen, which is suitable for subsequent treatment by the floatation process. While the ore is being ground a definite amount of an alkaline cyanide is added to the pulp in an amount of one to three pounds of cyanide per ton of dry ore. At the same time, a collecting reagent may be added to the pulp, such for example as coal tar, which may be added in suitable quantities depending upon the character of the ore. It has been found in practice that the addition of two pounds of cyanide per ton of ore will usually give satisfactory results but this amount may be decreased or increased according to the ore.

The pulp or ground ore, with the cyanide solution and with or without a collecting agent as may be desirable, is then agitated for a period of approximately one-half to two hours to bring all of the exposed particles of the precious metal in the pulp into intimate contact with the alkaline cyanide in the solution. Any well known style of agitator may be employed, such as a Pachuca tank or a Dorr agitator. The exact period of agitation will be determined by the character of the ore and the condition of the precious metals therein, but I have found that an agitation of approximately one hour is usually sufficient to produce satisfactory results.

After agitation for a suitable period of time, a precipitant is added to the mixture of pulp and cyanide solution. Any well known precipitant may be used such as zinc dust or aluminum dust; and soluble sulphides or charcoal may be used. Thereupon the mixture with the precipant added is agitated for a further period of approximately fifteen minutes to one-half hour in order to combine with any gold or silver which may have been dissolved by the cyanide solution during the preceding period of agitation. The total amount of precipitant is relatively small and approximately one pound or less per ton of dry ore is sufficient usually to precipitate the precious metal and prevent losses with the cyanide solution.

The mixture comprising the pulp, the alkaline cyanide and the precipitating agent, and with or without a collecting agent, may then be concentrated by the floatation process after the addition of a suitable frothing and collecting reagent, such as refined pine oil. The floatation process is carried out in the usual manner without any change or modification by reason of prior treatment by the process herein set forth.

By means of my improved process it is possible to treat complex ores containing sulphides of the baser metals or oxidized compounds of the baser metals, such as copper, lead, zinc, iron, etc., with a relatively high recovery of the gold and silver content. The cyanide is used in very small quantity, but it is sufficient to clean and freshen the particles of the precious metals so that the percentage of recovery of the precious metals is greatly increased in the subsequent treatment by the floatation process. Also any values of gold and silver which may have gone into the solution with the cyanide are recovered by the introduction of the precipitant, which is added to the solution during the step of agitating and which passes with the pulp to the floatation tank and is recovered by concentration. It will be evident of course that the pine oil or any other suitable frothing agent may be added during the step of agitating the pulp with the cyanide solution and the precipitant and that various other substitutions, changes and omissions in the several steps of my process and in its operation may be made by those skilled in the art without departing from the spirit of the invention.

I claim as my invention:

1. In the art of recovering precious metals from complex ores, the process which consists in mixing the ground ore with a cyanide solution of a strength sufficient to attack any film or coating upon the precious metal particles contained in the ore without substantial absorption of the metal particles thereof, adding a precipitant of the precious metals contained in the solution, agitating the mixture with the precipitant therein and then concentrating the metal constitutents of the ore and the precipitant.

2. The process of treating ore that contains precious metals which consists in mixing the crushed ores with a weak cyanide solution to remove any coating or film on the precious metal particles contained in the ore, adding a precipitant to recover any values in the solution, agitating the precipitant and solution to induce reaction of the precipitant with the metals in solution, and then subjecting the mixture with the precipitant therein to a floatation process.

3. In the art of recovering precious metals from complex ores, the process which consists in subjecting the crushed ore to the action of a weak cyanide solution to remove any coating or film upon the precious metal particles contained in the ore without dissolving any substantial part of the metal particles, agitating the ore and solution, adding a precipitant thereto and then concentrating the metal constituents of the ore and the precipitant.

4. The process of treating ores to recover precious metals therefrom which consists in mixing the ore in a finely divided condition with a solution containing not more than two pounds of cyanide for each ton of dry ore being treated, agitating the ore and solution for a period of time sufficient to remove any coating or film upon the precious metal particles contained in the ore, adding a precipitant and then concentrating the metal constituents of the ore and the precipitant by floatation.

5. In the treatment of ores containing gold and silver, the process which consists in subjecting the ore in a finely divided condition to the action of a weak solution of an alkaline cyanide, agitating the mixture for a period of time sufficient to remove any coating or film on the precious metal particles contained in the ore, adding a precipitant to the mixture, again agitating the mixture with the precipitant for a relatively short period of time to induce reaction of the precipitant with any metal dissolved by the cyanide and then concentrating the metals of the ore and the precipitant by floatation.

Signed at El Paso, in the county of El Paso and State of Texas, this second day of June, A. D., 1924.

HENRY W. KAANTA.